(12) United States Patent
Minkenberg

(10) Patent No.: US 6,944,170 B2
(45) Date of Patent: Sep. 13, 2005

(54) SWITCHING ARRANGEMENT AND METHOD

(75) Inventor: Cyriel Minkenberg, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 09/839,836

(22) Filed: Apr. 20, 2001

(65) Prior Publication Data

US 2002/0064156 A1 May 30, 2002

(30) Foreign Application Priority Data

Apr. 20, 2000  (EP) .......................................... 00108676

(51) Int. Cl.[7] .............................................. H04L 12/56
(52) U.S. Cl. ..................................... 370/411; 370/538
(58) Field of Search ................................ 370/360, 389, 370/390, 412, 411, 415, 419, 423, 428, 429, 363, 371, 378, 381, 3, 352–358, 395.4, 395.43, 493, 538, 535

(56) References Cited

U.S. PATENT DOCUMENTS 5,787,086 A  *  7/1998  McClure et al. ............ 370/413
5,898,670 A  *  4/1999  Hoebeke et al. ............ 370/468
5,910,942 A  *  6/1999  Grenot et al. ............... 370/236

* cited by examiner

*Primary Examiner*—Wellington Chin
*Assistant Examiner*—Brenda Pham
(74) *Attorney, Agent, or Firm*—Douglas W. Cameron

(57) ABSTRACT

The invention is related to a switching arrangement for transporting data packets which comprise a section with data packet destination information and a payload section, to one or more output ports. The switching device is able to route the arriving data packets according to the data packet destination information, to at least one dedicated of the output ports. It comprises at each input port an input buffer with at least as many single input queues as there are output ports, and an input controller for each input port, serving for controlling the order of multiplexing the data packets from the input queues of the corresponding input buffer to the switching device. The input buffer comprises a demultiplexer for making for each of the arriving data packets an entry into those of the input queues, which are identified in the packet destination information of the corresponding data packet, whereby each input controller is designed to allow simultaneous transmission of those data packets whose entries are located in different input queues and whose payload sections have identical content.

21 Claims, 2 Drawing Sheets

US 6,944,170 B2

SWITCHING ARRANGEMENT AND METHOD

The invention relates to a switching arrangement for packets of data, with several input ports and several output ports and which is determined for the transportation of incoming packets according to their header to one or more designated of the output ports and from there to a subsequent device. More particularly the invention relates to a switching arrangement which routes data packets through a switch fabric, with a plurality of input queues per input port whereby multicast data packets are first distributed to several input queues and afterwards processed simultaneously when the traffic situation permits. As data packets, particularly ATM cells or also Ethernet frames can be accepted.

TECHNICAL FIELD AND BACKGROUND OF THE INVENTION

Fast switching of information, be it samples of analog signals or alphanumeric data, is an important task in a communication network. The network nodes in which lines or transmission links from various directions are interconnected for exchanging information between them are often the cause of delay in the transmission. If much traffic is concentrated in a node, and if in particular most of the traffic passes through only few of the links, increased delays or even loss of information are often encountered. It is therefore desirable to have switching nodes which allow fast routing.

In EP 312628 is described a switching apparatus for interconnecting a plurality of incoming and outgoing transmission links of a communication network, or for exchanging data between incoming and outgoing computer- and workstation connection links. Furthermore, known packet formats are described.

The article "Input vs. output queuing on a space-division packet switch" by Karol et al. in IEEE Global Telecommunications conference, Houston, Tex., December 1986, p 0659–0665 a comparison of the two queuing models is performed.

The article "A 622-Mb/s 8×8 ATM Switch Chip Set with Shared Multibuffer Architecture" by Kondoh et al. in the IEEE Journal of Solid-State Circuits, Vol. 28, No. 7, July 1993, an asynchronous transfer mode switch chip set, which employs a shared multibuffer architecture, and its control method are described.

In "Input Queuing of an Internally Non-Blocking, Packet Switch with Two Priority Classes" by Chen and Guérin, in IEEE Infocom 89 Proceedings, Volume II, April 1989, the concept of input queuing in combination with different packet priorities is contemplated.

An overview over prior art switching technology is given on the Internet page www.zurich ibm.com/Technology/ATM/SWOCPWP, wherein an introduction into the PRIZMA Chip is illustrated. Another source for information about this topic is the publication "A flexible shared-buffer switch for ATM at Gbit/s rates" by W. E. Denzel, A. P. J. Engbersen, I. Iliadis in Computer Networks and ISDN Systems, (0169-7552/94), Elsevier Science B.V., Vol. 27, No. 4, pp. 611–624.

The PRIZMA chip comprises a shared common output buffer has 16 input ports and 16 output ports which provide a port speed of 300–400 Mbit/s. The switch's principle is first to route incoming packets through a fully parallel I/O routing tree and then to queue the routed packets in the output buffer. In addition to this, the chip uses a separation between data (payload) and control (header) flow. Only the payloads are stored in a dynamically shared output buffering storage. With this architecture, head-of-the-line-queuing is avoided. The PRIZMA chip has a scaleable architecture and hence offers multiple expansion capabilities with which the port speed, the number of ports and the data throughput can be increased. These expansions can be realized based on a modular use of the PRIZMA. Also singlestage or multi-stage switch fabrics can be constructed in a modular way.

The PRIZMA chip is especially suited for broadband telecommunications, based on ATM, i.e. the Asynchronous Transfer Mode. However, the concept is not restricted to ATM-oriented architectural environments. ATM is based on short, fixed-length packets, often called cells and is supposed to be applied as the integrated switching and transmission standard for the future public Broadband Integrated Services Digital Network (BISDN). PRIZMA's topology and queuing arrangement for contention resolution employs a high degree of parallelism. The routing function is performed in a distributed way at the hardware level, referred to as self-routing. ATM packets are classified into several packet types, particularly packet types with different payload sizes, and the PRIZMA chip is dedicated to handle packets with a payload up to 64 bytes. However, also packet payloads with 12, 16, 32 or 48 bytes are often to be transported.

The fanout F of a multicast packet is defined to be the number of output ports it is destined to. An arriving input packet is distinguished from the output packets it generates; an input packet with a fanout of F generates F output packets.

In a purely output-queued switch, multicast can be performed almost trivially. Upon arrival of a multicast packet, it is simply duplicated to every output queue it is destined for. However, there is a significant drawback to this approach, as each incoming packet may have to be duplicated up to N times, which is a waste of internal memory bandwidth. This problem can be solved by adopting a shared-memory switch architecture, where the output queues handle only pointers to the actual data stored in a memory shared by all output queues. Thus, the packet data need only be stored once, while the pointer to the data is duplicated. This scheme is also referred to as replication at sending (RAS).

The bandwidth through the shared memory of an output-queued switch must equal N times the individual port speed, which poses significant implementation concerns at high line rates. Because of this, input-queued switches have gained popularity in recent years. The performance limitations of FIFO-queued crossbar-based switches have been largely overcome by applying techniques such as virtual output queuing (VOQ), combined with centralized scheduling to achieve good throughput.

VOQ entails the sorting of incoming packets at the input side based on the packet's destination output. This arrangement is fine for unicast traffic, but does not fit well with multicast; for example, in which queue would one store an incoming multicast packet that has F different destinations? The generally accepted solution is to add an (N+1)-th queue at each input that is dedicated to multicast traffic. This raises two new problems, (a) how to schedule packets from the N multicast queues, and (b) how to integrate multicast with unicast traffic in a fair way.

Concerning multicast data packets, in the classical VOQ-arrangement, a multicast data packet requires special handling. The switching device in this case does not contain any buffer. This means that in order to send a multicast data packet, all output ports where this data packet goes to have to be free. This results in additional complexity in the routing controller: it has to recognize that this is a multicast data packet, then has to ensure that no other input adapter sends a data packet to one of the output ports where the multicast data packet goes to, and then has to grant the sending allowance to the input adapter which will send the multicast packet and finally has to set the path in the switching device. As long as the routing controller is a simple logic, this is doable, but at the moment routing controllers become pipelined and run with sophisticated algorithms which try to ensure best fairness and handling of priorities, this becomes a really complex task. A known current practice is to build separate multicast-queues where all adapters put their multicast data packets. This totally disrupts the relation between non-multicast and multicast traffic, which is hence considered a suboptimal solution. It is not possible to send two multicast data packets, one from a first input adapter and one from a different input adapter, when there is at least one output port which overlaps in the destinations of these two multicast data packets. This severely disrupts the throughput performance.

In "Queueing Strategies for Multicast Packet Switching", IEEE Globecom '90, San Diego Calif., USA, 1990, pp. 1431–1437, Hui and Renner provide an overview of multicast scheduling strategies for input-buffered switches with FIFO queues. They distinguish between unicast service and multicast service, the former entailing sequential transmission to each of a multicast packet's destinations, while in the latter case multiple destinations can be served at once. They also introduce the notion of fanout splitting for the multicast service case; this means that a multicast packet may be transmitted over the course of multiple timeslots, until all of its destinations have been served. The opposite is one-shot scheduling, where all destinations have to be served simultaneously. Fanout splitting has a clear advantage over one-shot scheduling becausehead-of-line blocking is reduced. Multicast service is clearly preferable to unicast service for a multitude of reasons, the main one being that it is wasteful of bandwidth towards the switch because a packet with a fanout of F must be transmitted F times across the input link, resulting in poor utilization and large delays. The authors come to the conclusion that an FCFS service with fanout splitting is best in terms of throughput, delay, and fairness.

Despite the advances made with respect to multicast scheduling, the input-queued architectures presented above face several problems.

The FIFO organization of the multicast queue is prone to head-of-line blocking, in particular under heavy multicast load. Although concentrating algorithms try to minimize the impact by quickly serving entire head-of-line packets, they can never eliminate it. If it were possible to somehow apply the VOQ arrangement used for unicast traffic also to multicast traffic, head-of-line blocking would be eliminated completely.

Integration of multicast and unicast traffic, and fairness between multicast and unicast traffic are issues that have gone largely untouched. Ideally, no artificial distinction should be made between the two types of traffic with respect to either the queuing discipline or the scheduling discipline in order to ensure fairness among all input/output pairs regardless of traffic type.

Packet switches that rely solely on output queuing are not well scalable to high data rates because of the high memory bandwidth requirement. Implementations that use a high degree of parallelism can achieve the desired bandwidth, but limit the amount of memory that can be integrated on a single chip, thus potentially leading to high packet loss rates and highly traffic-dependent performance.

OBJECT AND ADVANTAGES OF THE INVENTION

It is an object of the invention according to claim 1 to provide a switching arrangement and according to claim 9 to provide a switching method, offering a higher throughput than known arrangements.

It is another object to provide a switching arrangement respectively method that solves the above mentioned open issues, while offering superior performance compared to existing approaches.

SUMMARY OF THE INVENTION

The invention proposes a switching arrangement for transporting data packets which comprise a section with data packet destination information and a payload section, to one or more output ports. The switching device is able to route the arriving data packets according to the data packet destination information, to at least one dedicated of the output ports. It comprises at each input port an input buffer with at least as many single input queues as there are output ports, and an input controller for each input port, serving for controlling the order of multiplexing the data packets from the input queues of the corresponding input buffer to the switching device. The input buffer, also referred to as input adapter, comprises a demultiplexer for making for each of the arriving data packets an entry into those of the input queues, which are identified in the packet destination information of the corresponding data packet, whereby each input controller is designed to allow simultaneous transmission of those data packets whose entries are located in different input queues and whose payload sections have identical content.

The method proposed here is based on the principle of fanout splitting: a multicast packet may be transmitted in multiple parts rather than being transmitted to all its destinations at once. This approach has been shown to offer generally better performance because blocking is reduced. Upon reception of a packet, it is duplicated to each of its destination VOQs. This constitutes the splitting part of the method. On the transmission side, each input queue's arbiter applies the following method: To select (a) which of the head-of-line packets to transmit, and (b) the set of destinations to transmit the packet to.

The first part of the method is identical to the selection method proposed earlier for unicast packets. However, the second part of the method adds multicast support by performing a multicast transmission merge iteration. This technique stems from the observation that when a certain packet has been chosen to be transmitted to one certain destination by the unicast selection method, it can simultaneously be transmitted to all its destinations for which an output queue grant has been received. This method can be called Multicast Split/Merge (MSM) because of the way multicast packets are first split up into their individual output packets at VOQ ingress, and then, if applicable, merged together again at the VOQ transmission point.

The MSM method exhibits the following fairness properties in a shared memory arrangement:

No VOQ can be starved due to the round-robin nature of the method. Flows competing for the same output, regardless whether unicast or multicast, will receive a fair share of bandwidth because they share the same VOQ, unlike in the case of a dedicated multicast queue. Fairness among input ports is guaranteed by the switching device, by allowing either all or none of the input ports to send, depending on the shared memory and output-queue state.

With each shared-memory location, an occupation counter is kept. These counters are initialized to zero. When a data packet arrives, the address manager will provide a free address if one is available, and the data packet will be stored at that location; otherwise, the data packet will be dropped in its entirety. The corresponding occupation counter is set in the number of destinations requested by the data packet's header. The address is appended to each VOQ to which the data packet is destinated.

When an address is selected by the arbiter, also referred to as the input controller, the corresponding data packet is transmitted from the shared memory. The address itself is returned to the address manager, along with a count determined by the arbiter indicating the number of destinations the data packet is being transmitted to in the current cycle. The address manager decreases the occupancy counter by this number. If the counter reaches zero, indicating that the data packet has been delivered to all its destinations, the address is returned to the free pool.

Before the data packet leaves the input queue, a new destination bitmap is inserted according to outcome of the arbiter's selection method. Incoming queue-full, queue-empty and memory status information from the switching device, signaling the occupance states of the common output buffer and of the output queues, can be used by the arbiter in its decision-taking process.

The second iteration in the selection method (the multicast transmission merge) can actually be performed in parallel on all VOQs by having N address comparators, one at each VOQ, comparing the address at the head of the VOQ with the one selected. The outcome of the N comparators ANDed with the output queue grant vector represents the destination vector to which the current packet will be transmitted.

DESCRIPTION OF THE DRAWINGS

Examples of the invention are depicted in the drawings and described in detail below by way of example. It is shown in FIG. 1 an input-buffered switch arrangement with several input queues per input port and full data-packet queuing FIG. 2 an input-buffered switch arrangement with several imput queues per input port and pointer queuing All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
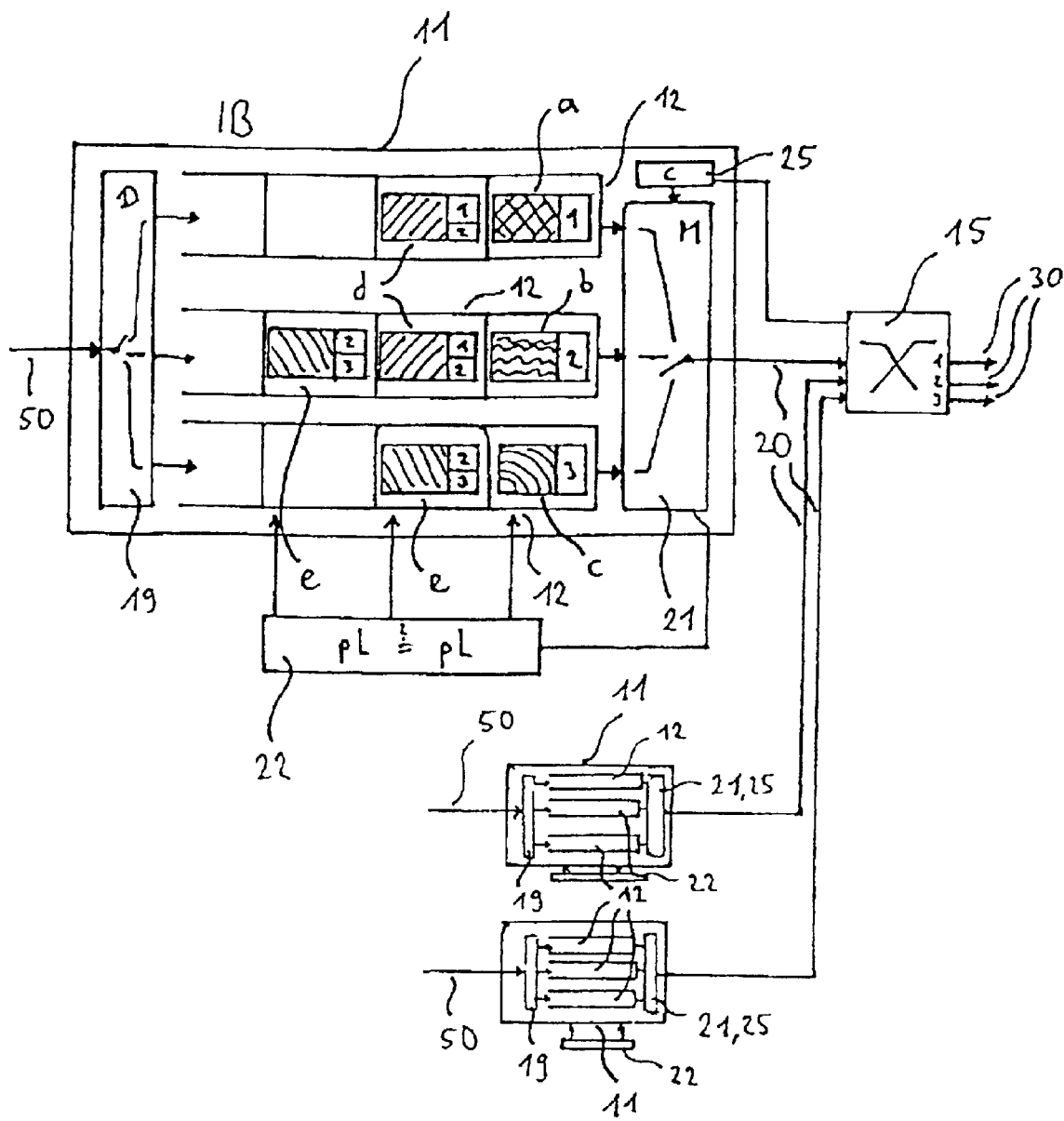

In FIG. 1 an input-buffered switching arrangement for handling data packets is shown. The arrangement comprises a switching device 15, such as a crossbar switch, with a number N of input ports 20 and a number N of output ports 30. At each input port 20 an input buffer 11, realized in form of a FIFO queue, designated also with "IB", is arranged. Each input buffer 11 comprises an input controller 25, designated also with "C", which is itself connected to the switching device 15 The purpose is to lead the data packets, which arrive via communication lines 50, and which are supposed to arrive at one or more of the output ports 30, to these output ports 30. From the output ports 30, the data packets can be delivered to subsequent devices, be it further switching devices or receiving devices, etc.

The data packets are divided up into a packet header section and a packet payload section. In the packet header section, data packet destination information is contained, telling to which of the output ports 30 the respective data packet is to be delivered. There exist two types of data packets with respect to their data packet destination information: Unicast data packets and multicast data packets. A unicast data packet is a data packet that has only one of the output ports 30 as destination. In contrast hereto, a multicast data packet is destinated for more than one of the output ports 30. In FIG. 1 are depicted five exemplary data packets, a, b, c, d, e. A first data packet a is a unicast data packet directed to output port 1. A second data packet b is a unicast data packet directed to output port 2. A third data packet c is a unicast data packet directed to output port 3. A fourth data packet d is a multicast data packet directed to output ports 1 and 2. A fifth data packet d is a multicast data packet directed to output ports 2 and 3. In the packet payload section of a data packet any data that is to be delivered to a destination can be contained. Hence, by definition, a multicast data packet is a data packet whose payload is destinated for several output ports 30.

A not depicted routing controller is taking over the task to provide for the right connections between the input ports 20 and the output ports 30 according to the data packet destination information that is contained in each data packet header, and to signalize to the input buffers 11 when the path for the next data packet in the respective input buffer 11 is free, such that this next data packet can be taken from the input buffer 11 and be sent to its destination, i.e. the targeted output port 30.

The input buffers 11 are each split up into a multitude of input buffer queues, namely each input buffer 11 having exactly one input queue 12 for each output port 30. So each input buffer 11 comprises here N input queues 12. Each of these input queues 12 in one input buffer 11 serves for storing therein the arriving data packets for one dedicated output port 30. So the arriving data packets are sorted in each input buffer 11 according to their destination output port 30. Hence, if a unicast data packet heading for a certain output port 30 is blocked due to this output port 30 being busy, the only data packets that are blocked by this head-of-the-line-blocking unicast data packet are data packets heading for the same output port 30, while data packets heading for another output port 30 can be handled independently and be forwarded to the switching device 10 when the path towards their destination output port 30 is unoccupied. Indeed, in the theoretical case, this leads to a theoretical maximum throughput of 100%. In FIG. 1, the upmost input queue 12 stores the queued data packets for output port 1, the mid input queue 12 stores the queued data packets for output port 2, the lowest input queue 12 stores the queued data packets for output port 3.

This sorting per destination is also referred to as Virtual Output Queuing, short VOQ.

For distributing the data packets into the correct input queues 12 the input buffer 11 comprises a demultiplexer 19, also denoted with D. For selecting the data packets from the input queues 12 and delivering them to the switching device 15 the input buffer 11 comprises a multiplexer 21. The multiplexer 21 picks one data packet after the other from one of the input queues 12 and sends it to the switching device 15. The selecting process is controlled by the input controller 25 which gets its information from the switching device 15. The input controller 25 does at a certain point in time signal to the multiplexer 21 whether it can send a data packet to the switching device 15 and if yes, to which output port 30. The order of fetching the queued data packets from the several input queues 12 is first determined by the accessability of the output ports 30, i.e. their occupance state. When an output port 30 is idle, it is ready to receive a data packet and this is signalled to the input controllers 25. Among the several input controllers 25 a policy is applied which distributes the right to send the queued data packets to the switching device 15. A simple policy would be "round robin" which equally distributes this right by giving it to one input buffer 11 after the other. Once one of the input buffers 11 has been assigned the right to send a queued data packet to a specific output port 30, the multiplexer 21 of that input buffer 11 is set to the corresponding input queue 12 and the data packet queued therein is transmitted to the switching device 15 for being routed to the respective output port 30.

Multicast data packets are distributed at the demultiplexer 19 by making an entry into each input queue 12 whose corresponding output port 30 is denoted in the data packet destination header. Here, simply the multicast data packet is copied and entered itself into each such input queue. Hence in the depicted example the fourth data packet d, which is a multivcast data packet heading for outputs 1 and 2, is entered a first time into the input queue for output port 1 and a second time into the input queue for the output port 2. The same way, the fifth data packet e is entered in the mid and in the lowest input queue 11. This means that each multicast data packet heading for a number of n different output ports 30 is copied and queued such that n copies thereof reside in the input buffer 11 where the data packet arrived. On the side of the multiplexer 21 the principle of fetching only one data packet at a time is altered in that for multicast data packets it is allowed to send several copies thereof to the switching device 15 at once. Therefor the input buffer 11 is equipped with a comparator 22 that, for each data packet that is going to be sent to the switching device 15, finds out whether another data packet with the same payload content, hereinafter referred to as payload-equal packet, is queued in another of the input queues 12 of the same input buffer 11. If this is the case, it can be assumed that the payload-equal packet is a copy of the data packet that was going to be sent, hereinafter referred to as original packet, and hence the original packet can not only be delivered to the switching device 15 for routing it to the output port 30 corresponding to the input queue the original packet was queued in, but also to the output port 30, the payload-equal packet was directed to, provided this second output port is idle as well. This is not only feasible for one payload-equal packet but for any payload-equal packet that is found by the comparator 22.

With other words, the disadvantage introduced by copying and distributing of a multicast data packet, which takes place at the demultiplexer 19, is countereffected by the advantage of merging several payload-equal packets into one forwarding process at the multiplexer 21. In the optimal case, all payload-equal packets can be merged with the original packet to be handled at the same time, but this depends on the states of the concerned output ports 30.

The search for payload-equal packets in the input queues 12 in a first embodiment is only performed by checking the places in the input queues 12 that have the same ranking position as has the original packet in its input queue 12. This method is fast since it does not need to check places with other positions and it preserves the order of the queued data packets.

However the searching and merging may even be implemented in a way such that the places subsequent to the position of the original packet in the other input queues 12 are examined. Of course, the more such places are searched, the longer it takes to search, but on the other hand, the higher is the probability to find payload-equal packets which can be transmitted simultaneously. Once a payload-equal packet has been found in a place ranked behind the place of the original packet, it is simply taken out of the order and the original packet is submitted to both output ports 30. The same applies to several found payload-equal packets. The ranking means the position of a queuing place in an input queue 12. The head of the line could be seen as ranking 1, the place behind as ranking 2 and so on.

The action of the comparator 22 can either be performed each time a data packet is supposed to leave the input buffer 12, or only in the case that data packet is recognized as being a multicast data packet. This is easily achievable when the data packet is stored with its header which tells whether a data packet is a unicast or a multicast data packet, or if a respective piece of information is queued with the data packets which contains that information. In principle it is not necessary to keep the headers of the data packets when queuing them, since the destination information is given by the input queue 12 the data packets are queued in. So in an improved version, the data packet header is removed and only the payload is queued.

The simultaneous transmission of the data packets from one input buffer 11 to the switching device 15 is hence enabled by comparing the payloads of several queued data packets. Once several data packets with identical payload have been found, the multiplexer 19 shall send only those data packets simultaneously whose input ports 20 have signalized their idleness, i.e their ability to reveive a data packet.

The comparator 22 incorporates the searching and comparison logic for finding equal payloads, resp. entries. The input controller 25 represents the arbiter for selecting which data packet at which time to send from the input buffer 12 to the switching device 15.

Figure 2:
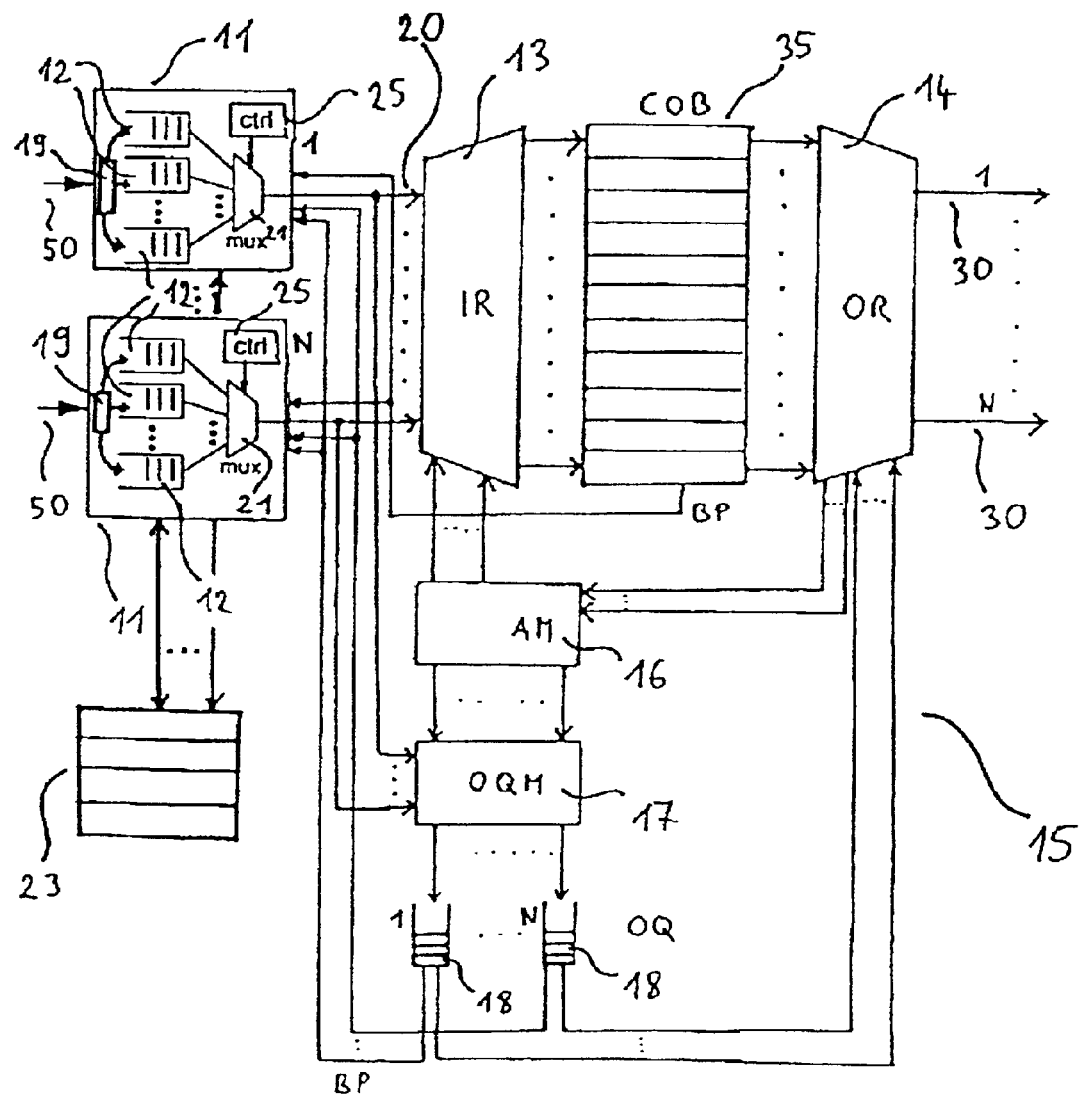

In FIG. 2, an arrangement is shown which comprises the N input buffers 11 leading to an input router 13, designated also with "IR", which has at its input side again the number N of input ports 20. At the output side of the input router 13, a common output buffer 35, designated also with "COB", is arranged, which serves for all data packets coming from the input router 13. At the output side of the common output buffer 35 a second router 14, namely an output router 14, designated also with "OR", is arranged. The routers 13, 14 provide here for each input port 20 the possibility to reach each output port 30 in a non-blocking way. Hence, at any point in time each input port 20 can send a data packet to any of the output ports 30, if such a data packet is arriving.

In parallel to the input router 13, the output router 14, and to the output buffer 35, an address-manager 16, designated also with "AM", is arranged, connected to the input router 13 and to the output router 14. The address-manager 16 is connected to an output-queue-manager 17, designated also with "OQM", which receives input from all input buffers 11 and from the address-manager 16. For each output port 30 an output queue 18 is arranged, designated also with "OQ", which provides input to the output router 14 and receives input from the output-queue-manager 17.

All arriving data packets are routed via the input router 13 to the common output buffer 35. The address-manager 16 provides the input router 13 with the information at which place in the common output buffer 35, i.e. at which address therein, the arriving data packets are to be stored. Alternatively, the architecture can be designed, that the input buffers 11 get that information and provide the input router 13 therewith.

The information, at which address in the output buffer 35 each data packet that is heading for a specific output port 30 is stored, is written into the output-queue-manager 17, more precisely, into the output queues 18 thereof. This information is referred to as order information. For each data packet that is stored in the common output buffer 35 such order information is put at one place in the output queue 18, where this data packet shall be sent to. The addresses are thereby sorted according to the corresponding output ports 30, i.e. those output ports 30 for which the packets stored at the respective addresses are heading. This means, that each output port 30 retrieves the addresses of the data packets, which shall arrive at that output port 30, from the respective output queue 18. The address-manager 16 handles here simultaneously for each output queue 18 one address at each point in time.

This means also that for each input port 20 one address is always held available, and this can be done already before the respective data packets arrive. Each data packet arriving head-of-the-line at an input port 20, hence finds an address where to be lead by the input router 13. These N addresses are provided by the address-manager 16 also to the output-queue-manager 17 which receives as input further N pieces of data packet destination information which provide the mask for into which output queue 18 to enter the order information for all arrived data packets. The parallel handling of the addresses for all input ports 20 increases the speed and fairness of data packet processing. The case of non-availability of addresses is discussed further below.

Every incoming data packet is hence given an address by the address-manager 16, at which address this data packet is then stored in the common output buffer 35, whereby the address is stored at a place in the output queue 18 corresponding to the output port 30, the data packet is heading for. The information therefor, i.e. the data packet destination information, is derived from the packet header. The output router 14 serves for the final distribution, in that for each output port 30 it retrieves from the corresponding output queue 18 the next address and then fetches the data packet at that address and feeds it to the output port 30 which is the destination of that data packet. The fetching step is here a non-destructive reading process, which allows for multicast data packets to be handled in that they are only once stored in the common output buffer 35 but are read several times, until every output port 30 which has to receive this data packet, has received it. After reading of the data packet out of the output buffer 35, the respective address is released in that this address is fed back to the address-managing means 16, which can again assign this address to one of the input ports 20 for handling the next arriving data packet. For multicast data packets a counter, not depicted in the drawing, is used that upon storing the data packet is set to the number of output ports 30 this data packet is to be transmitted to, and is decreased each time this data packet is fetched by the output router 14. When the counter reaches the reading 0 for this data packet, the corresponding address can be given free.

The principle of sharing the output buffer 35 is introduced in that the output queues 18 in total have more queuing places than the output buffer 35 has addresses. By this measure, the input ports 20 have the impression that for each output port 30 there is more place in the output buffer 35 than only the output buffer 35 divided equally by the number of output ports 30. As long as the total traffic of the data packets does not exceed the real maximum capacity of the output buffer 35, the performance will increase, since the arrangement is much more flexible concerning extreme traffic pattern change. Particularly bursty traffic can be handled better, since the probability of data packet loss is reduced by allowing an output port 30 to use more output buffer space than its fair share thereof would offer.

Each input port 20 has its input buffer 11 with virtual output queuing, i.e. with the input queues 12 for each output queue 18 in each input buffer 11. The input buffers 11 are connected to the input router 13. Each input buffer 11 has its own input controller 25 for controlling the order of outgoing data packets from the different input queues 12 of that input buffer 11. Each input buffer 11 has its own input controller 25 which works independently from the other input controllers 25. This comes from the fact that this arrangement comprises an input router 13 which allows for all input buffers 11 to send their data packets independently via the input router 13, whenever the output queue 18 for this data packet and the common output buffer 35 still hold enough space therefor, i.e. no backpressure signal has been generated. The independence of the input controllers 25 reduces significantly the complexity of the overall controlling resources. Each input controller 25 here has only to handle the arriving data packets according to a predetermined decision policy which might be a round robin policy, a round robin policy with fairness and priority-level precedence or any other policy. Each of the input controllers 25 individually decides which of the data packets it has stored will be sent to the input router 13 next.

A feedback mechanism is introduced which serves for signaling to the input buffers 11, if a specific output queue 18 is full, i.e. a certain threshold value for that output queue 18 has been exceeded. Upon this signal, each input controller 25 can react in that data packets heading for this output port 30 are no longer sent from the input buffers 11, i.e. the data packets from the input queues 12 for the occupied output queue 18 are held back, while the other input queues 12 can continue sending data packets.

The backpressure scheme can as well be substituted by its negative equivalent, i.e. signaling whether an output queue 18 is able to receive further entries. A further improvement can be achieved by feeding back to the input controllers 25 a signal that gives the input controllers 25 more detailed information about the filling degree of the output queues 18. Since it is the target to have at any moment in time at any output port 30 a data packet to deliver to a next stage, the information that an output queue 18 is empty or almost empty can be fed to the input controllers 25 and be used to preferably send to the input router 13 those data packets which head for the respective output port 30. The status information of the output queues 18 can e.g. be derived by introducing one or several additional threshold values, e.g. a threshold value at a filling degree 0 or close to 0. An empty or almost empty output queue 18 will hence be reported to the input controller 25, which should then adopt his policy in a way, that this output queue 18 receives a data packet as soon as possible. Introducing several such threshold values allows a fine-grained status report to the input controllers 25 which can use this status report for each of the output queues to influence their data packet multiplexing policy accordingly. This status report hence functions as sort of opposite of the backpressure, hence as low-load alarm or load-maximizing scheduling feedback signal.

The backpressure signal BP can here be propagated more selectively to the input buffers 11, namely the backpressure signal originating in one specific output queue 18 is only guided to the corresponding input queue 12 in the input buffers 11, respectively input queues 12 in the case of multiple priorities. Hence, all other input queues 12 are not blocked by this backpressure and can continue sending their data packets to the common output buffer 35.

Since the input buffers 11 can more easily be physically separated from the switching device 15 due to the smaller number of connection lines between the input buffers 11 and the switching device 15, the input buffers 11 can be realized with cheaper memory chips, and hence their buffer size can in reality be chosen much larger than its could be for the output buffers 35 at the same prize. Hence with this scheme, the finite input buffers 11 represent a better approximation to the theoretical infinite input buffers 11.

To achieve a correct handling of the data packets, a flow-control mechanism for the data packets is added also for the output buffer 35, performed by a not depicted backpressure generator, which creates a signal outgoing from the output buffer 35 to all input buffers 11, which signal signalizes to the input buffers 11 that the output buffer 35 is no longer able to buffer arriving data packets and hence the input buffers 11 are prevented from sending further data packets to the output buffer 35, until the backpressure induced by the signal has disappeared. The backpressure signal is created when the amount of data packets buffered in the output buffer 35 exceeds a predetermined threshold. This threshold is set lower than the actual size of the output buffer 35 in order to be able to buffer those data packets that may be sent during the time which the backpressure signal needs to effect the backpressure in the input buffers 11. Since in the case of sharing, the sum of the number of places of all output queues 18 is bigger than the number of addresses in the output buffer 35, the output buffer 35 can be filled up although no output queue 18 is reaching its threshold value for the therein stored data packets. Hence, the output buffer 35 also has a threshold value for occupied addresses, which when reached effects the creation of a memory-full-backpressure signal, designated also with "BP", to all input buffers 11 which in that case, all have to stop sending their data packets to the output buffer 35 via the input router 13. As soon as the number of occupied addresses falls below the threshold value, normal operation can be resumed.

The input buffer 11 with virtual output queuing is here realized using an additional common input buffer 23 with or without sharing, applying the same principle as with the common output buffer 35. This means that the arriving data packets can be stored in the common input buffer 23 while their addresses therein are stored in the input queues 12, ordered according to the output ports 30 where these data packets are heading. The addresses hence represent the entries for the data packets that are entered into the input queues 12. For multicast data packets only one entry in the common input buffer 23 need be made, whereby in every input queue 12 which corresponds to an output port 30 the multicast data packet is heading for an entry is made. This entry in the input queues 12 is a pointer to the location where the multicast data packet or its payload is stored in the common input buffer 23. These entries are hence identical for multicast data packets and since the payload need only be stored once, memory space is saved. For implementing the common buffering of the payloads, the same elements, here not depicted, as used for the common output buffer 35 are used, i.e. an input address manager and a router for delivering the payloads to the common input buffer 23. The demultiplexer 19 plays a somehow similar role for the input queues 12 as does the output queue manager 17 for the output queues 18.

In this embodiment, the simultaneous transmission of copies of one and the same multicast data packet is possible for those of the copies, whose input port is idle, which here means whose output queue 18 has not given backpressure. In the ideal case, all copies can be transmitted at once, in the worst case each copy has to be transmitted separately.

The input buffers are typically arranged in form of switch adapters, also called input adapters or simply adapters. In the proposed invention, scaling the arrangement, also referred to as switch fabric, from e.g. 16×16, i.e. 16 input ports 20×16 output ports 30, to 32×32, all adapters need only change their queuing structure, but not their on-adapter input buffer 11. With proper foresight, this means that the actual number of linked-lists to manage this input buffer 11 as a collection of input queues 12 should be made programmable. Anyway, on the input adapter the complexity scales with the order of N, i.e. doubling the destinations means doubling the number of input queues 12 and output queues 18. With the classical VOQ-arrangement, doubling the number of switch input ports 20 and output ports 30 requires a square increase of requests, i.e. a 16×16 controlling means receives 256 requests, a 32×32 controlling means 24 requests.

In the case of the invention, if an input adapter has a multicast data packet to send, and the output queues 18 which will receive a copy of this data packet do not signal that their threshold is exceeded, the data packet can be sent. Multiple adapters can send multiple multicast data packets simultaneously, without ever having to know from each other where they actually send to. A potential collision is solved by the output buffer 35.

The performance of the switching arrangement can be increased in various ways. For the increase of number of input- and output ports, the switching arrangement can be arranged in a multistage or in a singlestage arrangement. In the multistage arrangement, the number of needed switching arrangements grows slower than in a comparable singlestage arrangement, i.e. with growing number of ports a multistage arrangement needs fewer switching arrangements than a singlestage arrangement.

However, the performance of a multistage arrangement is lower because of increased latency and because of the possibility of backpressure due to total use of an output queue by one connection which prevents processing of data packets with other destinations or a total use of the packet memory which blocks all switching arrangement input ports and propagates towards the preceding stage. This lower performance can to a certain extent be compensated by a speedup factor. This means that the switching arrangement is running at a higher speed than its environment. Then, an output buffer is needed behind the switching arrangement to queue the faster incoming data packets which are sent out from the last stage and are to be passed over to the following hardware environment at a lower speed. Another possibility is to increase switch-internal memory, such that total use is less likely. Such bigger memory is however extremely expensive and to some extent also physically limited. Increasing switch memory by the memory expansion mode avoids the physical limit but is nevertheless expensive. If in a multistage arrangement a subsequent switching arrangement is crowded (output memory is full, i.e. no address available, or output queue is full), a backpressure signal can be generated for all input ports, which backpressure signal is again transferred to all preceding switching arrangements. In the case of full output queues, the backpressure can be selectively blocking only data packets heading for the full output queue. In the case of full output buffer, all input ports are to be blocked. The backpressure signal blocks the preceding switching arrangement in that this switching arrangement can no longer send cells.

The herein presented switching arrangement is scaleable with any of the known expansion methods, e.g. known from the PRIZMA architecture mentioned in the chapter introducing background art. Hence speed expansion, port expansion, performance expansion, using memory expansion, which here would be availability of bigger output buffer space, link-paralleling and also master-slave principle, and finally any combination thereof, are applicable. The described embodiments are combinable in part or in a whole.

What is claimed is:

1. A switching arrangement for transporting data packets which comprise a section with data packet destination information and a payload section, said data packets heading via one or more input ports of a switching device towards one or more output ports, said switching device being able to route said data packets according to said data packet destination information, to at least one dedicated of said output ports, comprising at each input port an input buffer with at least as many single input queues as said switching arrangement has output ports, and an input controller for each input port, serving for controlling the order of multiplexing said data packets from said input queues of said corresponding input buffer to said switching device, comprising a demultiplexer for making for each of said data packets an entry into those of said input queues which are identified in said packet destination information of the corresponding data packet, whereby each said input controller is designed to allow simultaneous transmission of those data packets whose entries are located in different of said input queues and whose payload sections have identical content.

2. A switching arrangement according to claim 1, characterized in that each said entry comprises at least the payload section of the corresponding data packet.

3. A switching arrangement according to claim 1, characterized in that each said entry comprises a pointer to a memory cell wherein at least the payload section of the corresponding data packet is stored, said memory cell preferably being located in a common input buffer.

4. A switching arrangement according to claim 3, characterized in that for the case said data packet being a multicast data packet, the demultiplexer is designed to make several entries in said input queues and only one entry of the payload section thereof in a said memory cell.

5. A switching according to claim 1, characterized in that only those data packets whose entries are located in different of said input queues and whose payload sections have identical content, and whose entries's locations in the respective input queue have the same ranking, are simultaneously transmittable.

6. A switching arrangement according to claim 1, characterized in that only those data packets are simultaneously transmittable, whose entries are stored in a said input queue of a said input buffer (II), whose input port is free to receive said data packets.

7. A switching arrangement according to claim 1, characterized in that the switching device comprises an input router and an output router said switching arrangement further comprising a common output buffer with addresses for the data packets and address-managing means for managing the use of said addresses of said common output buffer, output-queue-manager for entering order information, about at which addresses said data packets are stored in said common output buffer, into output queues which are connected to said output router.

8. A switching arrangement according to claim 7, characterized in that the output queues provide in total more queuing places for the order information than the common output buffer has addresses, preferably the difference between the total number of places in the output queues and the total number of addresses in the common output buffer being lower than 50% of the total number of addresses.

9. A switching arrangement according to claim 7, characterized in that for the output queues and/or for the common output buffer a backpressure generator is provided for signalizing to the input buffers (II) that a threshold value of occupied places in one or more of the output queues respectively of occupied addresses in the common output buffer is exceeded.

10. A switching arrangement according to claim 7, characterized in that for a multicast data packet the order information thereof is enterable in each of the output queues for the output ports this multicast data packet is intended to reach and that the address thereof is only releasable by the address manager for another data packet, when all order information of said multicast data packet has been successfully processed by the output router.

11. A switching arrangement according to claim 1, characterized in that for data packets with different handling-priorities, for each class of priority and for each output port a separate input queue is provided.

12. A switching method for data packets heading for one or more output ports (30) of a switching arrangement, comprising the steps of:
   sorting said data packets at each input port according to the output ports which said data packets have as destination according to data packet destination information, into input queues of an input buffer which comprises at least as many of said input queues (12) as said switching arrangement has output ports (30), by making for each of said data packets (a, b, c, d, e) an entry into those of said input queues (12), which are identified in said packet destination information of the corresponding data packet (a, b, c, d, e),
   multiplexing said data packets from said input queues of their corresponding input buffer to a switching device,
   controlling with an input controller for each input port, the order of said data packets being multiplexed, whereby simultaneous transmission of those data packets is allowed, whose entries are located in different of said input queues and whose payload sections have identical content.
   routing said data packets according to said data packet destination information, to at least one dedicated of said output ports via said switching device.

13. A switching method according to claim 12, characterized in as each said entry at least the payload section of the corresponding data packet is used.

14. A switching method according to claim 12, characterized in that as each said entry a pointer to a memory cell wherein at least the payload section of the corresponding data packet is stored, said memory cell preferably being located in a common input buffer.

15. A switching method according to claim 14, characterized in that for the case said data packet being a multicast data packet, several entries are made in said input queues and the payload section thereof is stored only once in said memory cell.

16. A switching method according to claim 12, characterized in that only those data packets whose entries are located in different of said input queues and whose payload sections have identical content and whose entry locations in the respective input queue have the same ranking, are allowed to be simultaneously transmitted.

17. A switching method according to one of claim 12, characterized in that only those data packets are allowed to be simultaneously transmitted, whose entries are stored in a said input queue of a said input buffer whose input port is free to receive said data packets.

18. A switching method according to claim 12, characterized in that the data packets are routed via an input router to a common output buffer with addresses for said data packets, and order information, about at which addresses said data packets are stored in said common output buffer is entered into output queues which are connected to an output router being part of said switching device.

19. A switching method according to claim 18, characterized in that for the order information in the output queues in total more queuing places are provided, than the common output buffer has addresses.

20. A switching method according to claim 18, characterized in that for a multicast data packet the order information thereof is entered in each of the output queues for the output ports which this multicast data packet is intended to reach and that the address thereof is only released by the address managing means for another data packet, when all order information of said multicast data packet has been successfully processed by the output router.

21. A switching method according to claim 18, characterized in that when a threshold value of occupied places in one or more of the output queues respectively of occupied addresses in the common output buffer is exceeded, this is signalized to the input buffers.

* * * * *